(12) United States Patent
Abramson et al.

(10) Patent No.: US 9,723,374 B2
(45) Date of Patent: Aug. 1, 2017

(54) PROGRAMMATICALLY DETERMINING WHEN CREDITS APPEAR DURING A VIDEO IN ORDER TO PROVIDE SUPPLEMENTAL INFORMATION

(71) Applicant: Google Inc., Mountain View, CA (US)

(72) Inventors: Andrew Abramson, Sunnyvale, CA (US); Benjamin David Poiesz, Santa Clara, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/259,204

(22) Filed: Apr. 23, 2014

(65) Prior Publication Data

US 2015/0312647 A1 Oct. 29, 2015

(51) Int. Cl.
| | |
|---|---|
| *H04N 21/234* | (2011.01) |
| *H04N 21/81* | (2011.01) |
| *H04N 21/235* | (2011.01) |
| *G06K 9/00* | (2006.01) |
| *H04N 21/43* | (2011.01) |
| *H04N 21/236* | (2011.01) |
| *H04N 21/462* | (2011.01) |

(52) U.S. Cl.
CPC ..... *H04N 21/8133* (2013.01); *G06K 9/00442* (2013.01); *G06K 9/00624* (2013.01); *H04N 21/2353* (2013.01); *H04N 21/23418* (2013.01); *H04N 21/23614* (2013.01); *H04N 21/43* (2013.01); *H04N 21/4622* (2013.01)

(58) Field of Classification Search
CPC ........... H04N 21/2353; H04N 21/8133; H04N 21/23418; G06K 9/00624

USPC ............. 725/23, 32; 726/1, 21, 33; 719/320; 717/110, 106; 715/201, 203; 713/180, 713/186; 709/203, 218; 707/723; 705/14.23, 14.39; 704/231, 226, 246

See application file for complete search history.

(56) References Cited

U.S. PATENT DOCUMENTS

| | | | |
|---|---|---|---|
| 7,500,176 B2 | 3/2009 | Thomson et al. | |
| 8,527,525 B2 | 9/2013 | Fong et al. | |
| 2005/0228806 A1* | 10/2005 | Haberman | ........ G06F 17/30265 |
| 2007/0250901 A1* | 10/2007 | McIntire et al. | .............. 725/146 |
| 2009/0119717 A1 | 5/2009 | Newton et al. | |
| 2009/0158369 A1* | 6/2009 | Van Vleck | ......... H04N 21/8456 725/110 |
| 2009/0288124 A1* | 11/2009 | Aaby et al. | ..................... 725/93 |
| 2010/0034509 A1* | 2/2010 | Dodd | ................. G06K 9/00711 386/248 |
| 2010/0332560 A1* | 12/2010 | Gerbasi, III | ......... G11B 27/034 707/812 |
| 2011/0145883 A1* | 6/2011 | Godar | .................... H04N 5/445 725/131 |
| 2011/0280551 A1* | 11/2011 | Sammon | ....................... 386/289 |
| 2012/0195370 A1* | 8/2012 | Guerrero | ............. H04N 19/124 375/240.02 |

(Continued)

*Primary Examiner* — Robert Hance
(74) *Attorney, Agent, or Firm* — Morris & Kamlay LLP

(57) ABSTRACT

Described is a system and method for programmatically determining credits for a video content item. By determining a point at which credits are displayed, a content provider may effectively provide supplementation information in a contextual and non-intrusive manner. In order to determine when credits are displayed, individual frames of content may be decoded and various characteristics of the individual frames may be analyzed.

33 Claims, 3 Drawing Sheets

(56) References Cited

U.S. PATENT DOCUMENTS

2013/0132382 A1* 5/2013 Kuznetsov .............. G06F 17/30
  707/736
2013/0339998 A1* 12/2013 Arme ................. H04N 21/4668
  725/32

* cited by examiner

PROGRAMMATICALLY DETERMINING WHEN CREDITS APPEAR DURING A VIDEO IN ORDER TO PROVIDE SUPPLEMENTAL INFORMATION

BACKGROUND

During playback of multimedia content, a content provider may provide information to the user. This information is often superimposed on a screen during video playback, which often interferes with an enjoyable viewing experience. In addition, content providers may desire information after the user has finished watching the content. For example, rating information is best solicited once the user has completed watching the content in its entirety. When a viewer closes and/or leaves a viewing session, the willingness of a user to provide information fades. For example, rating content at a later time may be cumbersome and time consuming for a user. In addition, the advantage of displaying information in a relevant context is no longer present. Accordingly, providing information after a user ends a viewing session diminishes the overall effectiveness of displaying and/or soliciting contextual information.

BRIEF SUMMARY

In an implementation, described is a method of determining a point at which credits appear during a video. The method may include decoding, by a computing device and to a storage, a predefined portion of a video content item into a set of individual frames and determining, by the computing device, characteristics of the set of individual frames to determine a transition between scenes of the video content. The method may also include performing, by the computing device, optical character recognition (OCR) on one or more frames of the set of individual frames to extract textual information and determining, by the computing device, a point at which the video content item displays ending credits based on at least one of the determined transition between scenes and the extracted textual information.

In an implementation, described is a method including providing, by a computing device and for output to a display operatively coupled to the computing device, a video content item and determining, by the computing device and during playback of the video content item, that the computing device has reached a predefined portion of the video content item. The method may also include analyzing, by the computing device and during playback of the predefined portion of the video content item, a set of individual frames of the predefined portion to determine a point at which the video content item displays ending credits and providing, by the computing device and for output to the display, supplemental content information contemporaneous to the determined point at which the video content item displays credits.

In an implementation described is a device for determining a point at which credits appear during a video. The device may include a processor configured to decode, to a storage, a predefined portion of a video content item into a set of individual frames and determine characteristics of the set of individual frames to determine a transition between scenes of the video content. The processor may also be configured to perform optical character recognition (OCR) on at least one frame of the set of individual frames to extract textual information and determine a point at which the video content item displays credits based on at least one of the determined transition between scenes and the extracted textual information.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description serve to explain the principles of implementations of the disclosed subject matter. No attempt is made to show structural details in more detail than may be necessary for a fundamental understanding of the disclosed subject matter and various ways in which it may be practiced.

DETAILED DESCRIPTION

Described is a system and method for programmatically determining when credits appear during playback of a content item. Content items may include films, movies, TV show episodes, web videos, and other video content. By determining a point at which credits are displayed, a content provider may effectively provide supplemental information in a contextual manner. Credits may include ending credits or initial credits (e.g. credits that appear during the beginning of a video). Currently, it is common for a person to determine when credits appear manually during a quality control process. This is expensive, time consuming, and limits the overall number of content items that may be analyzed.

In an implementation, individual frames of content from a content item may be decoded and various characteristics of the individual frames may be analyzed. Individual frames may be analyzed to determine characteristics such as frame contrast and/or particular text that may be displayed during the credits. In addition, by analyzing particular text during the credits, contextual information such as recommendations may be provided. For example, by determining when credits are provided, content providers may "upsell" and/or recommend additional content to users during the ending credits of the content item. To increase effectiveness, recommendations may appear once the credits start "rolling" as opposed to the end of runtime for a video content item. For instance, once ending credits appear, there are typically only a few seconds to capture the attention of the user as they are likely to end a viewing session and/or switch to another content item.

Figure 1:
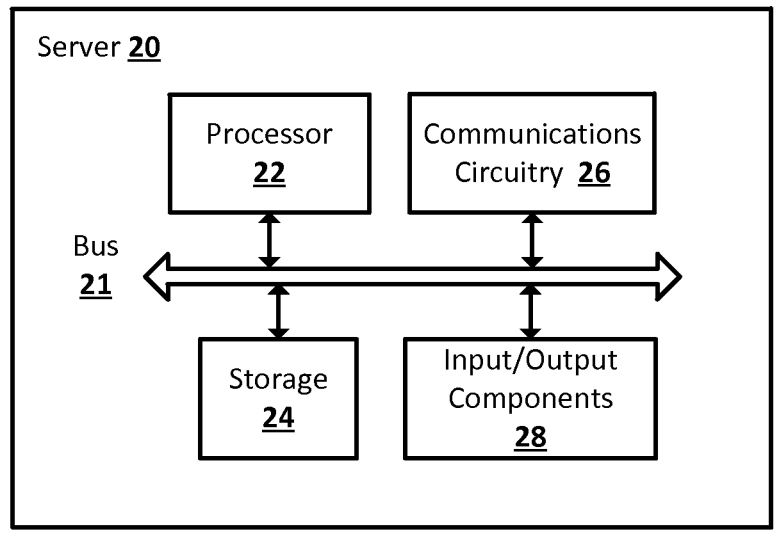
FIG. 1 shows a block diagram of a server according to an implementation of the disclosed subject matter.

FIG. 1 shows a block diagram of a server according to an implementation of the disclosed subject matter. The server 20 may include a bus 21 which interconnects major components of the server 20, such as a processor 22, a storage 24, communications circuitry 26, and input/output components 28. The processor 22 may be any suitable programmable control device and may control the operation of one or more processes such as content analysis and encoding/decoding as discussed herein and other processes performed by the server 20.

The storage 24 may be integral with the server 20 or may be separate and accessed through an interface. The storage 24 may store content (e.g. videos), software (e.g., for implementing various functions on server 20), and other data. The storage 24 may include a suitable storage medium, such as one or more hard-drives, solid state drives, flash drives, and the like.

The input/output components 28 may include outputs components and/or interfaces for a display that provides visual output and may include a touch-sensitive screen. The input/output component may also include input components and/or interfaces for user input devices that allow a user to interact with the server 20. For example, the user input devices may include a keyboard, a keypad, a mouse, touchpad, a touch screen, and the like.

Figure 2:
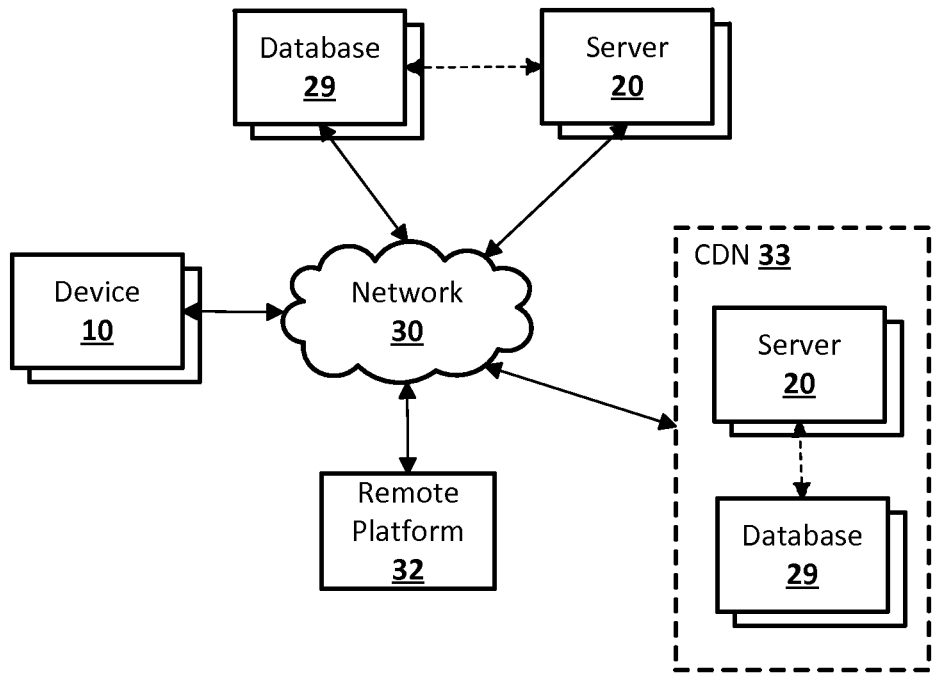
FIG. 2 shows an example network arrangement according to an implementation of the disclosed subject matter.

The communications circuitry 26 may include one or more interfaces to allow the server 20 to communicate with other servers 20, devices 10 and/or databases 29 via one or more local, wide-area, or other networks, as shown in FIG. 2. In addition, various high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor to control such communications intensive tasks such as packet switching, content management, and content delivery.

The server 20 may host one or more applications configured to manage services that may be associated with a user account. For example, the server may be configured to validate a device (e.g. device 10 as shown in FIG. 2) before the device is authorized to perform media related functions, including accessing locally stored media and/or media that available from a remote source. The server may maintain information related to a user account including account details, locally stored music, subscribed play lists, managed play lists, play back history, etc. The server 20 may also operate a media library (or media archive), which may be accessed by a device. Also, the server 20 may host one or more applications configured to interact with applications stored on the device to perform media synchronization, verification, and authorization.

FIG. 2 shows an example network arrangement according to an implementation of the disclosed subject matter. Implementations may include a device 10 (or computing device) which may include, or be part of, a variety of types of computing devices, such as a handheld device including a mobile phone or "smartphone," tablet computer, laptop, netbook, desktop, personal digital assistant ("PDA"), media device, set-top box, television, and/or watch, among others. The device 10 may include a bus, processor, storage, communications circuitry, and input/output components as described above. As described herein, actions may be performed by a computing device, which may refer to a device (e.g. device 10) and/or one or more processors of a server (e.g. processor 22) or a device 10. The network 30 may be a local network, wide-area network (including the Internet), or any other suitable communication network or networks, and may be implemented on any suitable platform including wired and/or wireless networks. The network 30 may be part of a public and/or a private network any may also include one or more gateways, which facilitate the transfer of data between devices using different protocols. Further, the network 30 may include secure links and/or unsecure links. Additionally, the network 30 may include network infrastructure provided by multiple parties, such as a host network and one or more partner networks (e.g. roaming partners). The devices 10 may communicate with other devices 10 and one or more servers 20 and/or databases 29.

Server 20 may be directly accessible by the device 10, or one or more other devices 10 may provide intermediary access to a server 20. The device 10 and/or server 20 may access remote platforms 32 or services provided by remote platforms 32 such as cloud computing arrangements and services. The remote platform 32 may include one or more servers 20 and/or databases 29. The term server may be used herein and may include a single server or one or more servers. For example, a server 20 may include one or more servers responsible for encoding/decoding, analysis and/or storing media files, or any combination thereof including additional or fewer types of servers. In addition, the server 20 may include, or be part of, a Content Delivery Network (CDN) 33.

Figure 3:
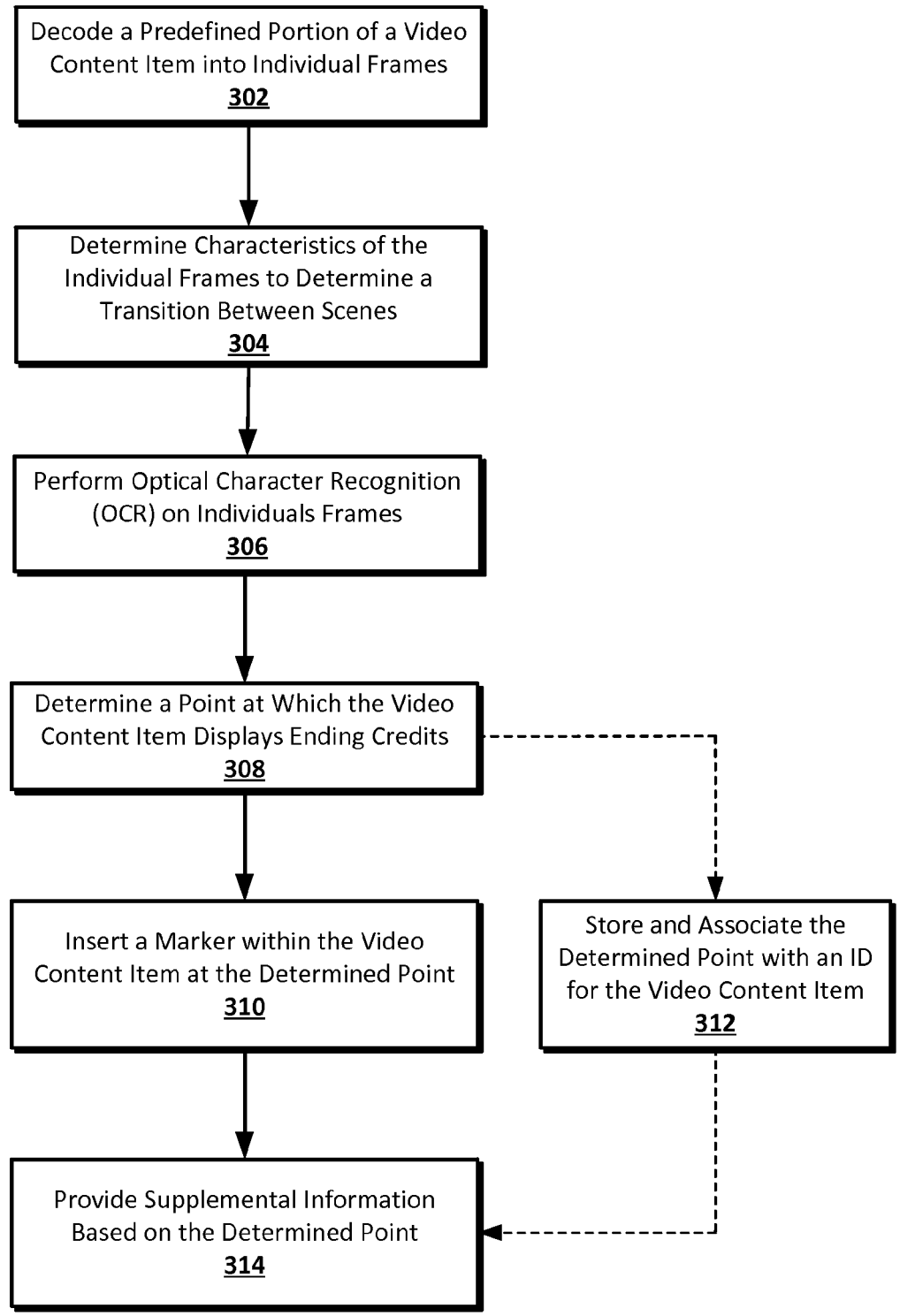
FIG. 3 shows a flow diagram of determining a point at which credits appear during a video according to an implementation of the disclosed subject matter.

FIG. 3 shows a flow diagram of determining a point at which credits appear during a video according to an implementation of the disclosed subject matter. In 302, a computing device (e.g. server 20) may decode, to a storage (e.g. storage 24), a predefined portion of a video content item into a set of individual frames. The decoding of the predefined portion of video may include isolating a set of frames at the end of the video. The predefined set of frames may be isolated using one or more techniques such as isolating a percentage of frames at the end of the video such as the last 10%. In another example, frames may be isolated based on a predetermined time value such as the last 2 minutes of a TV show or the last 10 minutes of a movie. In an implementation, the device may decode the video content item during an ingestion process such as when a new video is received (e.g. uploaded to a content server). The device may temporarily store the set of isolated frames as images and the set of images may be analyzed.

In 304, the device may determine characteristics of the set of isolated frames to determine a transition between scenes of the video content. The computing device may analyze "shot boundaries" to determine a set of frames that are transitions between scenes. For example, the device may determine a transition between a last scene in the movie and the rolling of ending credits. For example, the device may analyze contrast characteristics between frames such as identifying when a black background appears in individual frames, as a black background in a frame may be indicative of where credits would typically appear.

In 306, the device may also perform optical character recognition (OCR) on one or more of the isolated frames. The device may analyze display characteristics or the actual content of text to determine the appearance of credits. For example, the device may determine when text appears over a black background. In another example, the device may determine whether a certain threshold of text appears during a sequence of frames. In yet another example, the device may determine if particular text appears such as "the end" or text listing the names of the cast and crew. Characteristics of the format in which text is displayed may also be analyzed. For example, a set of frames that produces a vertically scrolling text effect would provide an indication that ending credits are displayed. In addition, the device may extract particular text as contextual information for the supplemental information. For example, text such as names of actors may be extracted and cross-referenced to suggest additional content items which include the same actors. In addition to analyzing the content of the video, the device may also analyze the soundtrack. For example, the device may recognize a particular audio track that commences, or the device may recognize the cessation of a speech dialogue in the soundtrack as an indication of when ending credits appear. For example, the device may retrieve information relating to the soundtrack of the video content to determine which audio track is played during the initial or ending credits. For instance, based on the retrieved information, the device may monitor the soundtrack to determine when the particular track is played as an indication of commencement of the ending credits.

In 308, the device may determine a point at which the video content item displays credits based one or more of the techniques described above. In an implementation, the device may determine the point based on the determined transition between scenes and the extracted textual information. The device may also analyze content items in batch to determine patterns among groups of items. For example, the device may analyze frames of multiple episodes of a particular series of content (e.g. TV Show) to determine a pattern. For instance, the episodes of a series may display credits in a similar manner or at a similar time for each episode. These patterns may also be used in combination with other techniques (e.g. frame characteristics, OCR, etc.) to analyze content items.

In 310, the device may insert a marker within the video content item at the determined point at which credits appear. This marker may indicate to a device (e.g. a server or a playback device) a point at which supplemental information may be displayed in a non-intrusive manner. The marker may be inserted during an ingestion process as described above or may be inserted in real-time during playback of the video content item. The marker may be inserted as metadata of the content item. For example, the metadata may include one or more fields specifying points during playback when credits appear at the beginning or end of the video. The marker may also be inserted (or encoded) within a content or data portion of the video. For example, a predefined frame or pattern, that is not perceptible to a viewer, may be inserted within the video and identified by a device during playback as an indication of when credits appear.

In 312, as an alternative or in addition to inserting a marker, the device may store the determined point on a storage and this determined point may be associated with an ID (identification) of the video content item. By storing the determined point rather than inserting a marker, alteration of the video content item is not required. A device may reference this point, prior to, or during playback of the content item in order to determine when to display supplemental information. During playback of a video content item on a device, the device may retrieve the determined point, for example, from a server by referencing the appropriate index using the ID of the video content item. In another example, a content server may retrieve the determined point from a storage, which may be part of a separate server (e.g. ad server), and then transmit the supplemental information to a remote playback device (e.g. while the device streams the content from the server) at the appropriate point during playback.

In 314, the device may provide supplemental information based on the determined point. The supplemental information may include any information that may be displayed by the device and may include information that may be contextual or interactive. For example, the supplemental information may include content recommendations including options to purchase content, advertising, requests for information, prompts for input commands, and other displayed information. For example, the device may display a menu option to select another content item. For instance, the device may suggest another movie of the same genre when the credits appear. This may also include options to purchase content. For example, the device may provide an option to purchase a movie after a rental, purchase a series (e.g. a season) after watching an episode, or to purchase the remaining parts in a set of movies (e.g. trilogy). In another example, an advertisement may be displayed during the ending credits such as an option to purchase related content (e.g. movie soundtrack) or other products that may be related to the content item. The supplemental information may also include requests for information such as a rating or survey information that may be solicited from the user. Requesting information immediately after a user has viewed the content may provide a higher degree of participation as well as more accurate responses as the content is still fresh in the user's mind. The supplemental information may also include prompts for input such as posting to a user's social media account including, for example, comments, ratings, or other information related to the viewed content item. In addition, the supplemental information may also include navigation options. For example, by determining when credits appear (e.g. initial credits), the user may be provided with an option to fast forward or skip the initial credits.

Figure 4:
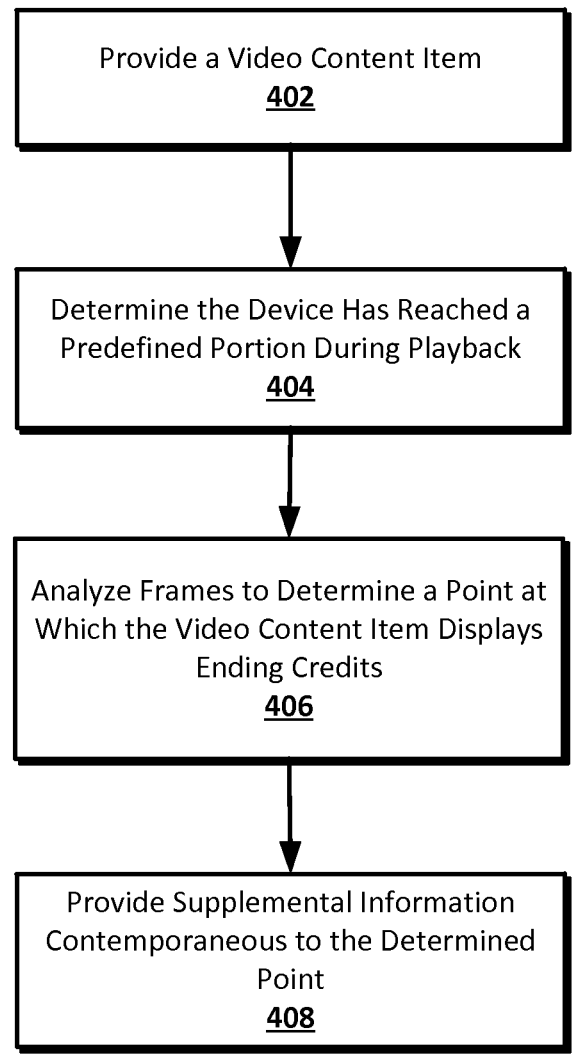
FIG. 4 shows a flow diagram of determining in real-time a point at which credits appear during playback of a video according to an implementation of the disclosed subject matter.

FIG. 4 shows a flow diagram of determining in real-time a point at which credits appear during playback of a video according to an implementation of the disclosed subject matter. As described above, the device may decode the video content item during an ingestion process. In addition, or as an alternative, the device may determine when credits appear in real-time. For example, during playback of a video content item, the device may determine that credits have appeared, and in response, provide supplemental information. The supplemental information provided to a user may be stored on the device or may be retrieved from a remote device such as a server.

In 402, the computing device may provide for output to a display operatively coupled to the device, a video content item. For example, a device may perform playback of a video content item that may be displayed on a television coupled to the device. Playback of the video content item may include playing a local copy (e.g. stored on the device), or may include receiving the video content from a remote source (e.g. streaming the content from a server).

In 404, the device may determine, during playback of the video content item, that the device has reached a predefined portion of the video content item. During playback of the video content item, the device may monitor a timer or a consumption value to determine whether a predefined portion of the video has been reached. For example, the device may determine that the movie is within the last 10 minutes of the total runtime. This provides a degree of efficiency by analyzing only a subset of the total number of frames of the video content. For example, it may be determined with a reasonable degree of certainty that ending credits will not appear prior to 10 minutes before the end of a movie.

In 406 the device may analyze, during playback of the predefined portion of the video content item, a set of individual frames of the predefined portion to determine a point at which the video content item displays credits. As described above, the analyzing may include determining characteristics of the set of individual frames to determine a transition between scenes of the video content item. For example, this may include determining that a subset of frames including a substantially black background. In another example, it may include determining that a subset of frames produces a vertically scrolling text effect. The analyzing may also include performing optical character recognition (OCR) on one or more frames of the set of individual frames to extract textual information. This may include extracting from the one or more frames one or more words as described above.

In 408, the device may provide, for output to the display, supplemental content information contemporaneous to the determined point at which the video content item displays credits. Contemporaneous to the determined point may include a time window after the credits begin to appear that the user may likely continue watching the content. For example, within 5 seconds of the ending credits appearance would likely still be a point in which the user is still viewing the video content. As described above, the supplemental information may include various types of information that may be contextual or interactive. For example, recommendations may be based on a rating provided by the user. In addition, the supplemental information may be contextual based on extracted words from performing OCR on a set of frames. For example, the supplemental advertising may include contextual advertising based on the extracted words.

Various implementations may include or be embodied in the form of computer-implemented process and an apparatus for practicing that process. Implementations may also be embodied in the form of a non-transitory computer-readable storage and/or memory containing instructions, wherein, when the instructions are loaded into and executed by a computer (or processor), the computer becomes an apparatus for practicing implementations of the disclosed subject matter.

The flow diagrams described herein are included as examples. There may be variations to these diagrams or the steps (or operations) described therein without departing from the implementations described herein. For instance, the steps may be performed in parallel, simultaneously, a differing order, or steps may be added, deleted, or modified. Similarly, the block diagrams described herein are included as examples. These configurations are not exhaustive of all the components and there may be variations to these diagrams. Other arrangements and components may be used without departing from the implementations described herein. For instance, components may be added, omitted, and may interact in various ways known to an ordinary person skilled in the art.

References to "one implementation," "an implementation," "an example implementation," and the like, indicate that the implementation described may include a particular step, feature, structure, or characteristic, but every implementation may not necessarily include the particular step, feature, structure, or characteristic. Moreover, such phrases are not necessarily referring to the same implementation. Further, when a particular step, feature, structure, or characteristic is described in connection with an implementation, such step, feature, structure, or characteristic may be included in other implementations whether or not explicitly described. The term "substantially" may be used herein in association with a claim recitation and may be interpreted as "as nearly as practicable," "within technical limitations," and the like.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described in order to explain the principles of implementations of the disclosed subject matter and their practical applications, to thereby enable others skilled in the art to utilize those implementations as well as various implementations with various modifications as may be suited to the particular use contemplated.

The invention claimed is:

1. A method, comprising:
   determining, by a computing device, whether a video content item corresponds to a first type of video content item or to a second type of video content item;
   decoding, by the computing device to a storage, only a predefined portion of the video content item into a set of individual frames, a duration of the predefined portion being a function of a type of the video content item, the type of the video content item being the first type of video content item or the second type of video content item;
   performing, by the computing device, optical character recognition (OCR) on one or more frames of the set of individual frames to extract textual information, the performing including determining if particular text appears;
   determining, by the computing device, a point at which the video content item displays credits based on the textual information; and
   inserting a marker, by the computing device, in the video content item at the point at which the video content item displays credits,
   wherein the marker indicates a point to display supplemental information with the video content item, and
   wherein the supplemental information is not included in the video content item.

2. The method of claim 1, further comprising storing and associating the marker with an identifier for the video content item.

3. The method of claim 2, further comprising sending, to a device and during playback of the video content item by the device, the point at which the video content item displays credits.

4. The method of claim 1, further comprising sending, to a server, the point at which the video content item displays credits, wherein the server stores and associates the point with an identifier for the video content item.

5. The method of claim 1, wherein the predefined portion of the video content item comprises an end portion of the video content item.

6. The method of claim 1, wherein the determining the characteristics comprises determining contrast between frames of the set of individual frames to determine the transition between scenes of the video content item.

7. The method of claim 1, wherein the determining the point at which the video content item displays credits is further based on determining that a predefined audio track commences.

8. The method of claim 1, wherein the determining the point at which the video content item displays credits is further based on determining that a speech dialogue ceases.

9. The method of claim 1, wherein the performing the optical character recognition (OCR) comprises extracting one or more words.

10. The method of claim 1, wherein the performing the optical character recognition (OCR) further includes at least one of determining if the textual information appears over a black background, determining whether a threshold of text appears during a sequence of frames, determining if text listing names appears, or determining that a set of frames includes a vertically scrolling text effect.

11. The method of claim 1, further comprising providing the supplemental information, wherein the supplemental information includes at least one of a menu option to select another content item or a prompt for a consumer of the video content item to post information to a social media account.

12. The method of claim 1, further comprising determining, by the computing device, characteristics of the set of individual frames to determine a transition between scenes of the video content item, wherein the determining the point comprises determining the point based on at least one of the transition between scenes or the textual information.

13. The method of claim 5, wherein the end portion comprises at least one of a percentage of frames of the video content item or a duration of a play time of the video content item.

14. The method of claim 1, wherein the first type of video content item comprises a television show and the second type of video content item comprises a movie.

15. A method, comprising:
providing, by a computing device and for output to a display operatively coupled to the computing device, a video content item;
determining, by the computing device, whether the video content item corresponds to a first type of video content item or to a second type of video content item;
determining, by the computing device and during playback of the video content item, that the computing device has reached a predefined portion of the video content item, a duration of the predefined portion being a function of a type of the video content item, the type of the video content item being the first type of video content item or the second type of video content item;
analyzing, by the computing device, during playback of the predefined portion of the video content item, a set of individual frames of only the predefined portion to determine a point at which the video content item displays credits, the analyzing including determining if particular text appears;
inserting a marker, by the computing device, in the video content item at the point at which the video content item displays credits; and
providing, by the computing device and for output to the display, supplemental information contemporaneous to the point at which the video content item displays credits, wherein the supplemental information is not included in the video content item.

16. The method of claim 15, wherein the analyzing the set of individual frames comprises:
determining characteristics of the set of individual frames to determine a transition between scenes of the video content item.

17. The method of claim 16, wherein the determining the characteristics of the set of individual frames comprises:
determining that a subset of frames includes a substantially black background.

18. The method of claim 16, wherein the determining the characteristics of the set of individual frames comprises:
determining that a subset of frames produces a vertically scrolling text effect.

19. The method of claim 15, wherein the analyzing the set of individual frames comprises:
performing optical character recognition (OCR) on one or more frames of the set of individual frames to extract textual information.

20. The method of claim 19, wherein the performing the optical character recognition (OCR) comprises:
extracting, from the one or more frames, one or more words.

21. The method of claim 20, wherein the supplemental information includes contextual information based on the one or more words.

22. The method of claim 15, wherein the supplemental information includes a menu option to select another video content item.

23. The method of claim 15, wherein the analyzing the set of individual frames comprises:
determining that a predefined audio track commences.

24. The method of claim 15, wherein the analyzing the set of individual frames further includes at least one of determining if the textual information appears over a black background, determining whether a threshold of text appears during a sequence of frames, determining if text listing names appears, or determining that a set of frames includes a vertically scrolling text effect.

25. The method of claim 15, wherein the supplemental information includes at least one of a menu option to select another content item or a prompt for a consumer of the video content item to post information to a social media account.

26. The method of claim 15, wherein the predefined portion of the video content item comprises an end portion of the video content item, the end portion being at least one of a percentage of frames of the video content item or a duration of a play time of the video content item.

27. The method of claim 15, wherein the first type of video content item comprises a television show and the second type of video content item comprises a movie.

28. A device, comprising:
a memory; and
a processor, the processor configured to:
determine whether a video content item corresponds to a first type of video content item or to a second type of video content item;
decode, to the memory, only a predefined portion of the video content item into a set of individual frames, a duration of the predefined portion being a function of a type of the video content item, the type of the video content item being the first type of video content item or the second type of video content item;
perform optical character recognition (OCR) on at least one frame of the set of individual frames to extract textual information and to determine if particular text appears;
determine a point at which the video content item displays credits based on the textual information; and
insert a marker in the video content item at the point at which the video content item displays credits,
wherein the marker indicates a point to display supplemental information with the video content item, and
wherein the supplemental information is not included in the video content item.

29. The device of claim 28, wherein the processor is further configured to perform the optical character recognition (OCR) by at least one of determining if the textual information appears over a black background, determining whether a threshold of text appears during a sequence of frames, determining if text listing names appears, or determining that a set of frames includes a vertically scrolling text effect.

30. The device of claim 28, wherein the processor is further configured to provide the supplemental information, wherein the supplemental information includes at least one of a menu option to select another content item or a prompt for a consumer of the video content item to post information to a social media account.

31. The device of claim 28, wherein:
the processor is further configured to determine characteristics of the set of individual frames to determine a transition between scenes of the video content item; and
the processor is configured to determine the point based on at least one of the transition between scenes or the textual information.

32. The device of claim 28, wherein the predefined portion of the video content item comprises an end portion of the video content item, the end portion being at least one of a percentage of frames of the video content item or a duration of a play time of the video content item.

33. The device of claim 28, wherein the first type of video content item comprises a television show and the second type of video content item comprises a movie.

\* \* \* \* \*